(12) United States Patent
Rau, III et al.

(10) Patent No.: US 7,086,705 B2
(45) Date of Patent: Aug. 8, 2006

(54) ZINC STUD INSERT

(75) Inventors: Charles B. Rau, III, Gig Harbor, WA (US); Dennis M. Burrell, University Place, WA (US)

(73) Assignee: Benmaxx, LLC, University Place, WA (US)

( * ) Notice: Subject to any disclaimer, the term of this patent is extended or adjusted under 35 U.S.C. 154(b) by 53 days.

(21) Appl. No.: 10/654,755

(22) Filed: Sep. 4, 2003

(65) Prior Publication Data

US 2005/0052073 A1 Mar. 10, 2005

(51) Int. Cl.
*B60B 2/50* (2006.01)

(52) U.S. Cl. .................. 301/35.625; 301/6.8; 301/113

(58) Field of Classification Search ........... 301/35.625, 301/6.8, 113, 114; 411/13, 383, 242, 433, 411/178, 900, 901, 902
See application file for complete search history.

(56) References Cited

U.S. PATENT DOCUMENTS

| 3,060,112 | A | | 10/1962 | Shomber |
| 3,330,177 | A | | 7/1967 | Oliver |
| 3,574,080 | A | | 4/1971 | James et al. |
| 3,620,119 | A | * | 11/1971 | King, Jr. et al. ............ 411/399 |
| 3,812,758 | A | | 5/1974 | Bossler |
| 4,143,579 | A | * | 3/1979 | Ziaylek, Jr. .................. 411/42 |
| 5,078,562 | A | * | 1/1992 | DeHaitre .................... 411/302 |
| 5,558,480 | A | * | 9/1996 | Kazino et al. ............... 411/368 |
| 6,053,683 | A | | 4/2000 | Cabiran |
| 6,461,092 | B1| * | 10/2002 | Tseng ........................ 411/383 |

* cited by examiner

*Primary Examiner*—Frantz F. Jules
(74) *Attorney, Agent, or Firm*—Barry L. Davison; Davis Wright Tremaine LLP

(57) ABSTRACT

In the trucking industry, a wheel stud having a recess at either end to accommodate a sacrificial insert of metal higher in the electromotive series of metals than the metals of the wheel stud assembly, the lug and the components joined thereby and being of sufficient difference in color from the surrounding materials so as to be readily visible without disassembling the combination, and a method for its use.

29 Claims, 5 Drawing Sheets

ZINC STUD INSERT

FIELD OF THE INVENTION

Particular aspects of the present invention relate generally to fasteners, and more particularly to means for reducing corrosion and binding of wheel assemblies (e.g., on heavy trucks).

The traditional means for removably attaching single or dual wheels to heavy truck axles involves a hub with hardened steel lugs pressed through its circumference which extend through aligned holes in the metal wheel and are secured thereto by single or double lug nuts. These removable components frequently weld together or bind due to corrosion and/or metal transfer, and efforts to separate them result in damage thereto.

Typically, water and road salts in the operating environment aid in the formation of corrosion/rust on the holding thread and/or splines of the wheel studs, so that the lugs become stuck on the wheel studs or the wheel studs become stuck in the hub. As a result, the studs have to be removed and replaced in order to prevent the wheel from becoming detached from the hub.

The use of fasteners with corrosion-inhibiting, fitted washers, such as J. E. Jones U.S. Pat. No. 3,574,080 and K. J. Shomber U.S. Pat. No. 3,060,112, or merely using washers made of non-conductive material between the components of the fastener assembly and the components to be fastened together, are known and utilized in the aviation industry and other high-tech assemblies. The unique arrangement of the components for removably attaching wheels to hubs on an axle of a heavy-duty truck place steel, steel alloys, and other dissimilar metals in close proximity, so a galvanic coupling is set up in the operating environment. The transfer of metal results in such corrosion that the lug can weld to the threaded end of the wheel stud or to the longitudinal splines on the end of the wheel stud pressed into the hub and the hubs corresponding mating splines. The problem of welding or corrosion of these components is that the components may be damaged in order to separate them for regular maintenance. This condition is what gave rise to W. H. Oliver U.S. Pat. No. 3,330,177, an impact cap for the threaded end of the wheel lug, to protect it when it is driven out of the wheel hub.

Accordingly, it is an object of this invention to provide a replaceable stud insert in the stud, at either or both ends, so that the strength of the wheel stud is undiminished, yet the stud insert acts as a sacrificial anode, made from metal higher on the electromotive series of metals, to protect the components of the wheel assembly from corrosion or transfer of metals from galvanic action. It is a further object of this invention to provide the stud insert in a location, and of a color dissimilar to the surrounding metals, to enable easy visual inspection without disassembling the wheel assembly. As the stud insert is eaten away, it can be re-set, staked, or replaced by pressing in a replacement insert.

It is a further object of this invention to provide a method of using the stud insert, to include a spherical cavity in the wheel stud, a swaging tool to install the stud insert, and staking the insert at is convex end extending from the end of the stud.

The invention, both as to its composition and method of operation, together with further objectives and advantages thereof, may best be understood by reference to the following description taken in connection with the accompanying drawings.

In the drawings:

FIG. 1 shows one side of an axle (2) to which a dual wheel assembly (1) is removably attached, comprised of an inside wheel (3) and tire (4), a hub (5), and outside wheel (7) and tire (8). As shown in FIG. 3, the wheel (3), (7) has a concave face (14) and, in FIG. 4, the wheel (3), (7) has a convex face (13).

Figure 2:
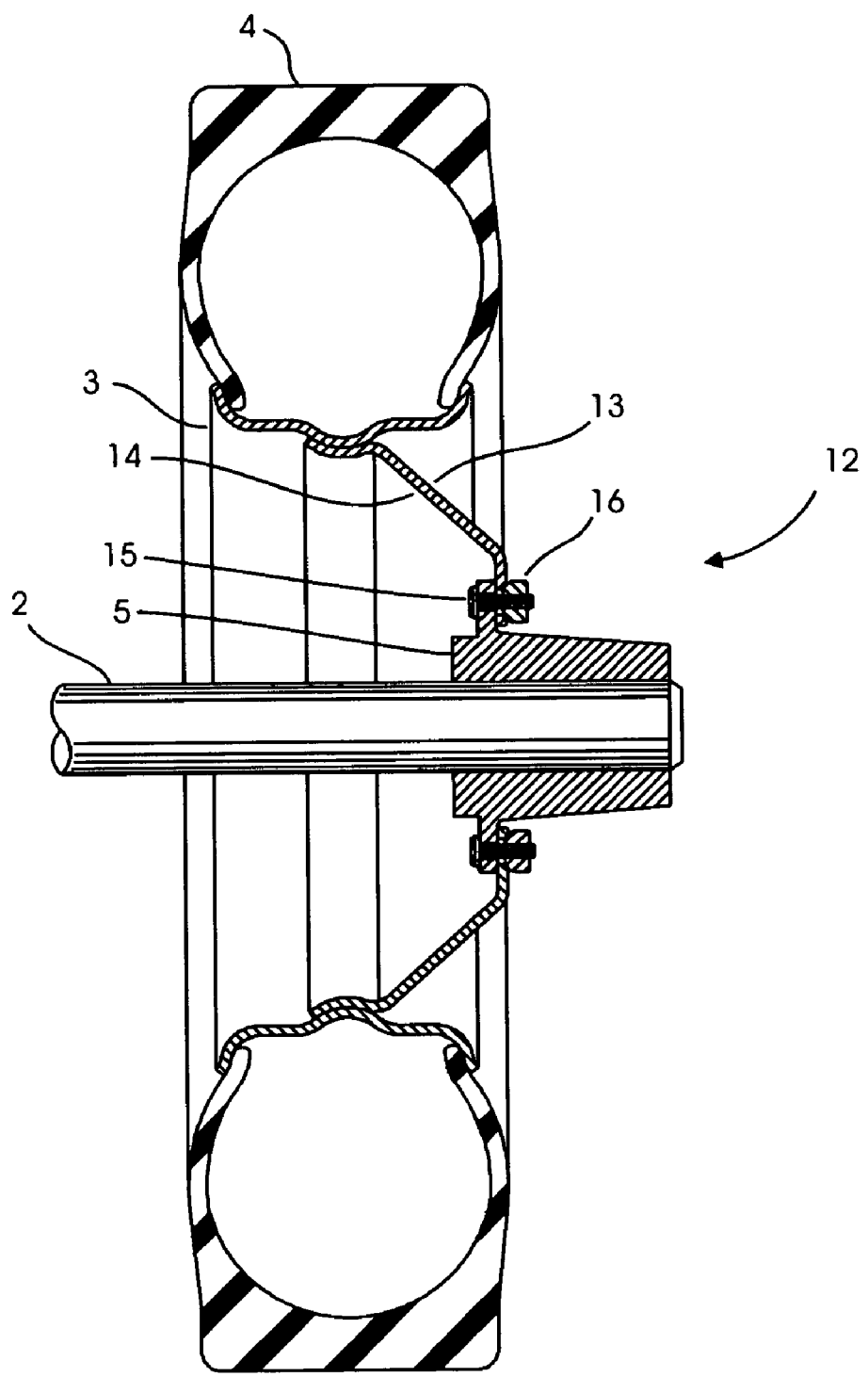
FIG. 2 is a sectional elevational view of one side of a single wheel assembly.
Figure 5:
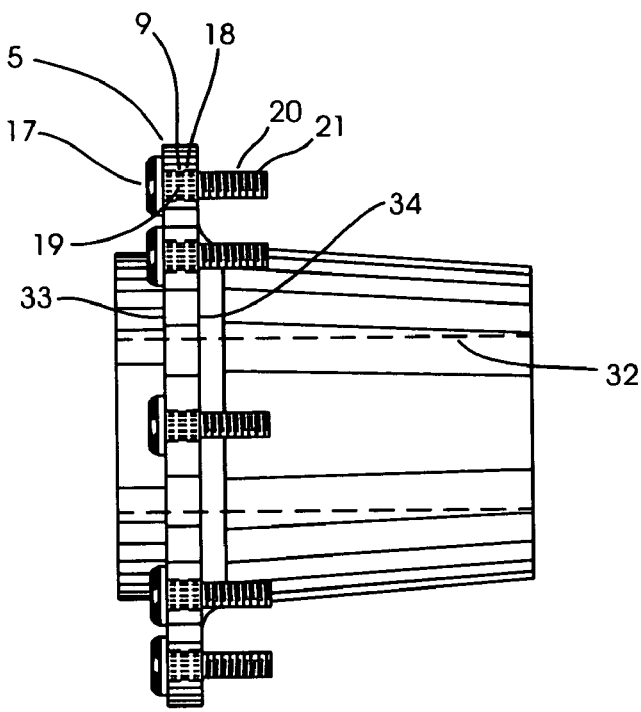
FIG. 5 is a side elevation of the hub.

FIG. 2 shows one side of an axle (2) to which a single wheel assembly (12) is removably attached, comprised of a wheel (3) and tire (4) and a hub (5). With reference to FIG. 5, a hub (5) is shown, being comprised of a disk of sufficiently strong material of sufficient thickness, having an axle passage (32) from the inside face (33) through to the outside face (34) and having a means to removably secure it to the axle (2). Regularly spaced in the hub (5) around the axle passage (32) are stud passages (9) from the inside face (33) through to the outside face (34) and being so arranged around the axle passage (32) so as to align with stud holes (35) in the wheels (3), (7). The stud passage (9) has splines (18) machined into its face and so arranged as to mate with splines (19) on the stud so that the stud assembly (6), (15) is prevented from turning in the stud passage (9).

Figure 7:
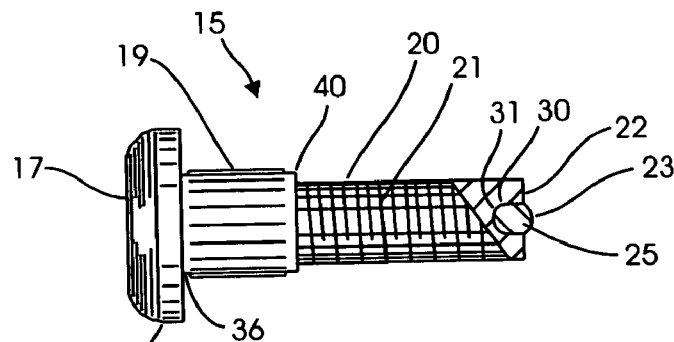
FIG. 7 is a side elevation partly in section of a preferred wheel stud for a single wheel assembly.

FIG. 7 shows a single wheel stud assembly (15) comprised of an elongated substantially cylindrical member, shank(40), having an enlarged stud head (17) at one end thereof, similar in shape to a bolt, of greater diameter than the diameter of the stud passage (9) in the hub (5). The diameter of the larger diameter section (36) of the cylindrical member of the stud (39) extending from the enlarged stud head (17) is of slightly smaller dimension than the inside diameter of the stud passage (9) and of length coincident with the distance from the inside face (33) to the outside face (34) of the hub (5) and has splines (19) on its outside circumference arranged laterally thereon and regularly spaced around its circumference so as to engage the splines (18) in the stub passage (9). Extending from the end of the larger diameter section (36) of the cylindrical member opposite the enlarged stud head (17) is a stud pin (20) of a slightly smaller diameter and having threads (21) throughout its length.

Figure 11:
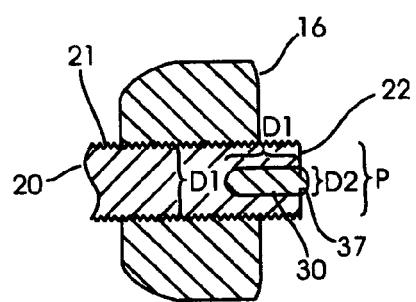
FIG. 11 is an expanded side cross sectional view of the stud pin section of the preferred stud assembly for a single wheel assembly.

The preferred embodiment of the invention and method for use is shown in FIGS. 7 and 11, wherein there is, at the end (22) of the stud pin (20), a plug cavity (30) continuing through the end (22) of the stud pin (20) and extending into the stud pin (20) along its center line, no more than the diameter of the threads (21) on the stud pin (20) (D$_1$), terminating in a spherical end (31) and having a diameter (D$_2$) of no more than 37.5% of the diameter of the threads (21) on the stud pin (20) (D$_2$=37.5% D$_1$), provided at least 5 threads (21) on the stud pin (20) extend beyond the lug (16) when properly torqued. Thus the maximum cross-sectional area (37) of the convex end of the stud insert (25) is determined by the formula (37)=$\sqrt{P.D_1}$ where P is the area of the threaded (21) end of the stud pin (22). The same formula applies for determining the maximum cross sectional area (37) of the convex end of the stud insert (23) in the plug cavity (24) in the enlarged stud head (17) for dual wheel assembly (1) application. The convex end of the stud insert (23) extends beyond the end (22) of the stud pin or the end of the enlarged stud head (17) so that the stud insert (25) can be staked during service, should the stud insert (25) become loose during normal service. The stud insert (25) is swaged into the plug cavity (30), (24) to keep it in place and provide electrical continuity between the stud insert (25) and the metal of the stud assembly (15), (6) and the metal of the wheel assembly (1), (12). Frequent inspection will be required to determine the security of the stud insert (25) and the rate it is sacrificed. This is the reason for the color of the stud insert (25) being clearly different than the color of the components of the wheel assembly (1), (12). In the preferred embodiment the stud insert (25) is made of zinc with the properties of Military Specification MIL-A -18001J.

FIG. 2 shows the single wheel assembly (12) with the preferred embodiment of the single wheel stud assembly (15) as installed at one end of an axle (2).

Figure 3:
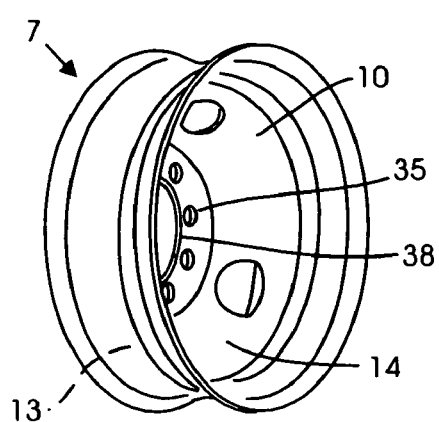
FIG. 3 is a quarter side elevation of the concave side of a wheel.
Figure 4:
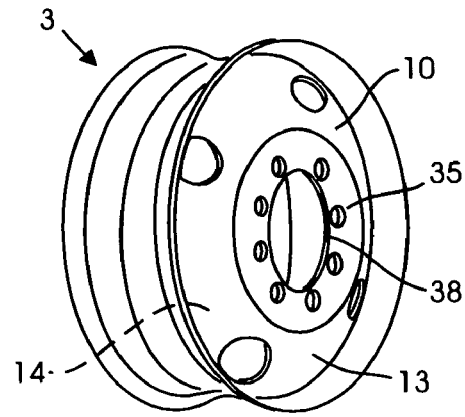
FIG. 4 is a quarter side elevation of the convex side of a wheel.
Figure 6:
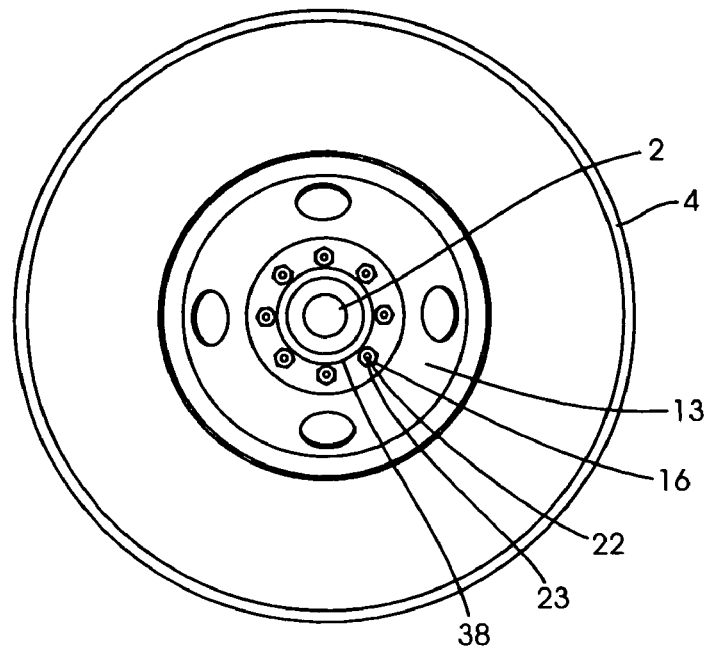
FIG. 6 is a front elevation of a single wheel assembly.

FIGS. 3 and 4 show a wheel (3), (7) with the center being spanned by a single plate (10) having a concave face (14) and the reverse side of the same having a corresponding convex face (13) and stud holes (35) there through regularly spaced around the circumference of the single plate (10) spanning the center of the wheel (3), (7) and so arranged as to accommodate the stud pins (20) installed in a hub (5). The center of the single plate has an opening (38) at its center of sufficient diameter to accommodate the axle (2). As shown in FIG. 6, in the single wheel assembly (12) configuration, the convex end (23) of the stud insert (25) is visible in the end (22) of the stud pin (20) with the wheel (3) installed on the hub (5) and the lug (16), or nut, properly torqued against the convex face (13) of the wheel (3).

Figure 1:
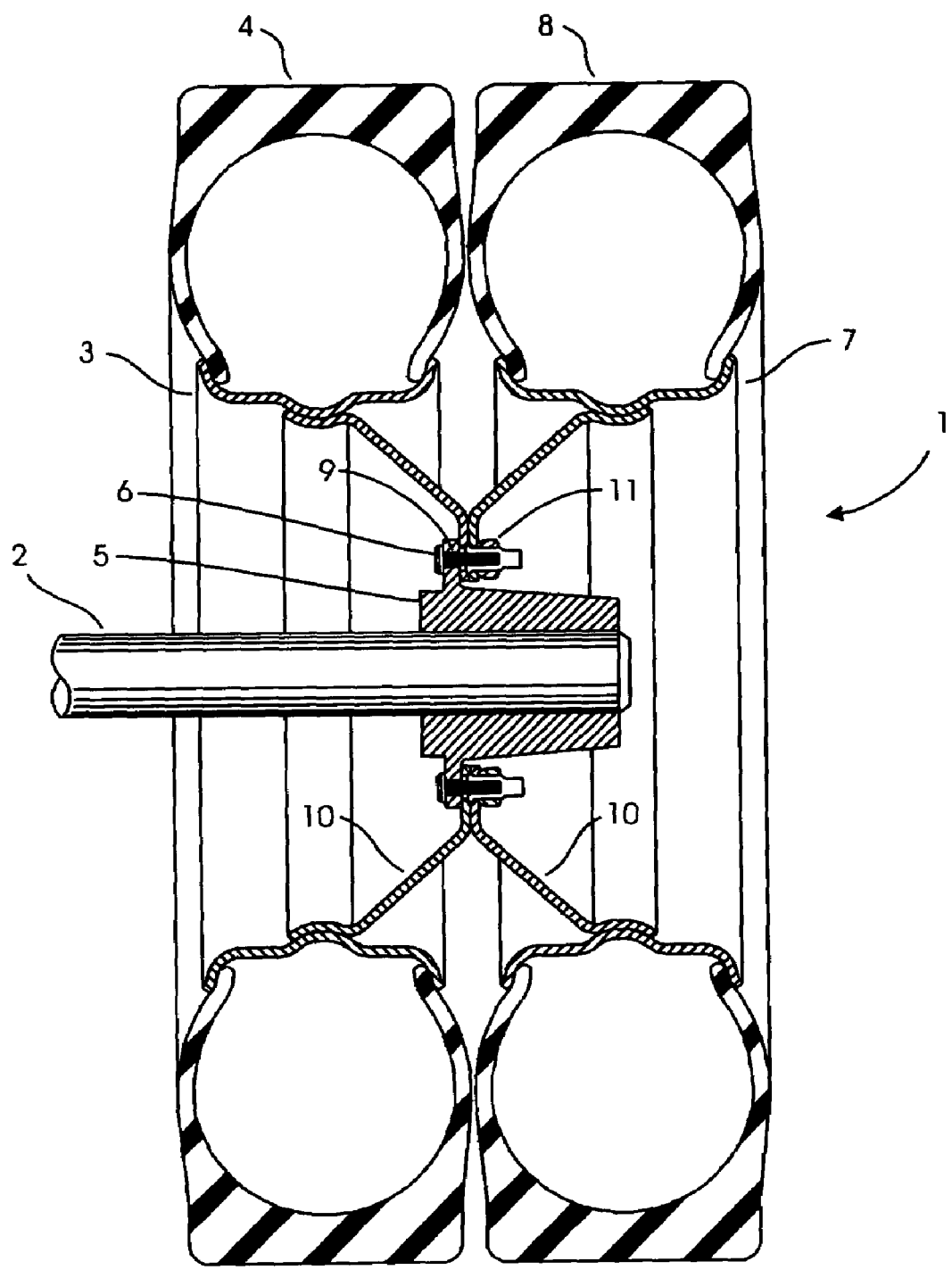
FIG. 1 is a sectional elevational view of one side of a dual wheel assembly.

In the circumstance, as shown in FIG. 1, where a dual wheel assembly (1) is used, the hub (5) has stud passages (9) of slightly smaller diameter to accommodate the smaller diameter of the splines (19) on the larger diameter section (36) of the cylindrical member of the stud (39) extending from the enlarged stud head (17). Similarly, the stud pin (20) has a slightly smaller diameter.

Figure 8:
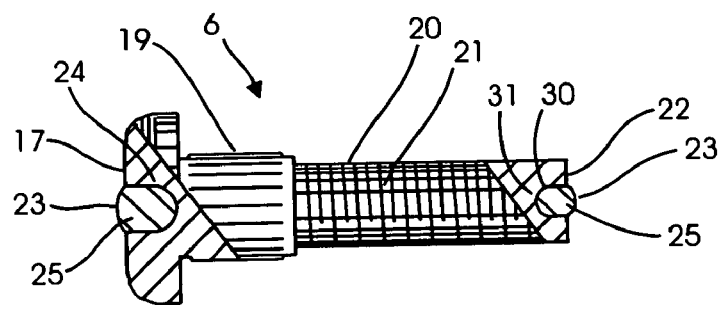
FIG. 8 is a side elevation partly in section of a preferred wheel stud for a dual wheel assembly.
Figure 9:
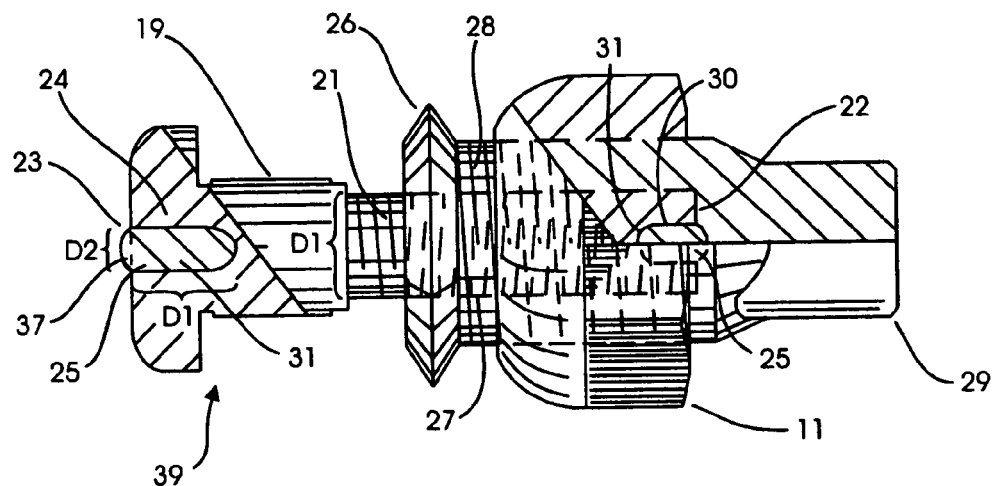
FIG. 9 is a side elevation partly in section of a preferred wheel stud for a dual wheel assembly with the dual threaded lug and dual over-lug.
Figure 10:
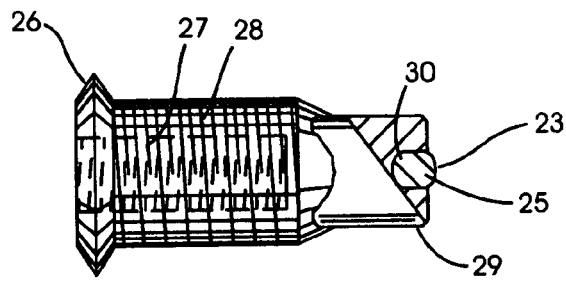
FIG. 10 is a side elevation partly in section of a preferred dual threaded lug.

With reference to FIGS. 8, 9, and 10, the components of the dual wheel stud assembly (6) are shown. The dual wheel stud assembly (6) is composed of a stud (39), a dual threaded lug (26) shown in FIG. 10, and a dual over-lug (11). The stud (39) is installed in the hub (5), as described above, and the inside wheel (3), with its concave face (14) toward the hub (5), is engaged on the hub (5) with the stud pins (20) extending through the stud holes (35). The dual threaded lug (26), having inside threads (27) and outside threads (28), is threaded on the stud pin (20) and tightened to the proper torque by means of its nut end (29) to secure the inside wheel (3) to the hub (5). Then the outside wheel (7), with its convex face (13) toward the hub (5), is engaged on the hub (5) with the dual threaded lug (26) extending through the stud holes (35). The dual over-lug (11) is threaded on the dual threaded lug (26) and tightened to the proper torque to secure the outside wheel (7) to the hub (5).

With reference to FIGS. 8, 9 and 10, the preferred embodiment of this invention for use with a dual wheel assembly is shown. Because the end of the stud pin (22) is covered by the dual threaded lug (26), the condition of the stud insert (25) in the end of the stud pin (22) is not available for easy visual inspection when the dual wheel assembly (1) is in operation. In addition, there are more communicating metal components in the dual wheel assembly (1), so that additional sacrificial material is needed to protect these metal components from corrosion and binding. Therefore, in the preferred embodiment, a plug cavity (24) is provided in the enlarged stud head (17), having the same relative dimensional limitation as the plug cavity (30) in the end of the stud pin (22), and the stud insert (25) also is provided with a convex end (23) to allow staking should the stud insert (25) become loose in operation. The condition of the stud insert (25) can be visually inspected without disassembling the dual wheel assembly (1). In addition, another plug cavity (30) may be provided in the nut end (29) of the dual threaded lug (26), maintaining the same relative dimensional limitation as the plug cavity (30) in the end of the stud pin (22).

As can be seen from the foregoing preferred and alternative embodiments of this invention, there is a central principle applied which involves a new and improved means and method of protecting metal components removably joined by means of a fastener from galvanic corrosion, wherein the fastener is provided with an integral, replaceable, sacrificial amount of metal, higher in the electromotive series than the metal of the assembly, and so located as to be readily seen upon inspection and replaceable without separating the assembly.

The foregoing disclosure and description of the invention are illustrative and explanatory thereof and, it will be understood by those skilled in the art, that various changes in the size, shape and materials, as well as in the details of the illustrated construction, may be made within the scope of the appended claims without departing from the scope or spirit of the invention.

We claim:

1. A metal fastener combination removably securing two or more metal components together, comprising a metallic shank extending through and communicating with the metal components, a metallic enlarged head formed integral with the shank at an end thereof, a threaded portion at the end thereof opposite to the enlarged head which extends through and protrudes beyond the secured metal components, a nut means for torquing the combination together, and a plug cavity in either end of the metallic shank, extending into the metallic shank along its center line to a spherically shaped end and being of a depth and cross-sectional area so as not to compromise the integrity of the fastener, an insert located in the plug cavity and externally visible therein, being formed from a metallic material higher in the electromotive series of metals than the metal fastener, metallic components secured and the nut means.

2. The combination of claim 1, wherein the insert is colored a visibly different color than that of the metal fastener, metallic components and nut means to aid in inspection of the condition of the insert.

3. The combination of claim 1, wherein the insert is comprised of zinc.

4. A method for protecting metal components joined by a fastener combination means comprised of a metallic shank extending through and communicating with the metal components, a metallic enlarged head formed integral with the shank at an end thereof, a threaded potion at the end thereof opposite to the enlarged head, which extends through and protrudes beyond the secured metal components and a nut means to torque the combination means together, from galvanic corrosion comprised of the steps of:

providing the fastener with an integral, replaceable, sacrificial means amount of metal, higher in the electromotive series than the metal of the assembly, which amount of metal is visible to inspection when the fastener is in use;

swaging an amount of metal, higher in the electromotive series than the other metal components, into the integral, replaceable, sacrificial means so that the metal protrudes in a convex face from the fastener combination means;

inspecting the condition of the amount of metal periodically for diminishment;

staking the convex face of the amount of metal into the integral, replaceable, sacrificial means should the amount of metal become loose due to the anodizing process; and replacing the amount of metal when it has deteriorated to the extent it provides no further satisfactory protection for the metal components.

5. The method of creating the integral, replaceable, sacrificial means of claim 4 comprised of the step of drilling a plug cavity into the threaded end of the shank and penetrating therein, along its centerline, a distance of no more than the diameter of the threads on the threaded portions and having a diameter of no more than thirty-seven percent of the diameter of the threads on the threaded portion, and terminating in a spherical end.

6. A single wheel stud assembly for removably securing a wheel assembly, comprised of a wheel, a tire, an axle and a hub with stud passages with lateral splines there through, comprised of a stud having an enlarged head at one end, an elongated, substantially cylindrical shank with a larger diameter section, extending from the enlarged head, with lateral splines regularly spaced around its circumference and so arranged as to engage similar splines in stud passages in the hub, threads along the remainder of the shank, stud pin, opposite to the enlarged stud head to its end, and a lug in removable communication with the threads on the shank, stud pin, and capable of being torqued against the components to be secured and a means for applying therein an insert means of sacrificial metal material higher in the electromotive series of metals than those of the wheel assembly and of sufficient amount to protect the components of the wheel stud assembly from corrosion in an operational environment containing moisture, road salts and acid which can set off battery action, so located as to not compromise the integrity of the wheel stud assembly and to be externally visible on inspection and replaceable without disassembling the wheel assembly, said means being comprised of:

a plug cavity so located in the threaded end of the stud pin and being of a depth and cross-sectional area so as to not compromise the integrity of the single wheel stud assembly and to be externally visible for inspection and maintenance without disassembling the wheel assembly;

a stud insert of malleable metallic material, higher in the electromotive series of metals than the components of the wheel assembly and capable of being swaged into the plug cavity.

7. The plug cavity of claim 6, at the threaded end of the shank, stud pin, extending inward from the end of the stud pin along the center line of the stud pin, no further than the diameter of the threads on the stud pin, terminating in a spherical end and having a diameter of no more than 37.5% of the diameter of the threads on the stud pin, provided at least 5 threads on the stud pin extend beyond the lug when it is properly torqued, so that the maximum cross-sectional area of the plug cavity is determined by the formula $\sqrt{P}$ times the diameter of the threads, where P is the area of the threaded end of the shank, stud pin.

8. The single wheel stud assembly of claim 6, wherein the stud insert comprises zinc.

9. The single wheel stud assembly of claim 6, wherein the stud insert comprises zinc suitable to act as a sacrificial anode to protect the components of the wheel assembly from corrosion.

10. The single wheel stud assembly of claim 6, wherein the stud insert is of a color that contrasts with the color of the material of the lug and the stud pin so as to be more readily visible for inspection.

11. The stud insert of claim 6 wherein the end of the stud insert, opposite to the spherical end of the plug cavity, protrudes from the end of the stud pin in a convex face so as to allow staking should the stud insert become loose in operation.

12. A dual wheel stud assembly for removably securing a dual wheel assembly, comprised of inner and outer wheels, 2 tires, an axle and a hub with stud passages with lateral splines there through, comprised of a stud having an enlarged head at one end, an elongated, substantially cylindrical shank with a larger diameter section, extending from the enlarged head, with lateral splines regularly spaced around its circumference and so arranged as to engage similar splines in the stud passage in the hub, threads along the end of the shank, stud pin, opposite to the enlarged stud head, a dual threaded lug having inside threads to engage the threads on the stud pin against the inner wheel, and outside threads and extending a sufficient distance beyond the end of the stud pin to accommodate the second wheel, having a nut end to facilitate torquing the dual threaded lug to secure the inner wheel, and a dual over-lug which engages the outside threads of the dual threaded lug and is torqued thereon to secure the outer wheel and a means for applying therein an insert means of sacrificial metal material higher in the electromotive series of metals than those of the dual wheel assembly and of sufficient amount to protect the components of the dual wheel stud assembly from corrosion in an operational environment containing moisture, road salts and acid which can set off battery action, located so as not to compromise the integrity of the dual wheel stud assembly and to be externally visible on inspection and replaceable without disassembling the dual wheel assembly, said means being comprised of:

a plug cavity so located in the enlarged stud head and being of a depth and cross-sectional area so as not to compromise the integrity of the dual wheel stud assembly and to be externally visible for inspection and maintenance without disassembling the dual wheel assembly;

a plug cavity so located in the nut end of the dual threaded lug and being of a depth and cross sectional area so as not to compromise the integrity of the wheel stud assembly and to be externally visible for inspection and maintenance without disassembling the dual wheel assembly; and a stud insert of malleable metal material higher in the electromotive series of metals than the components of the dual wheel assembly, capable of being swaged into the plug cavity.

13. The plug cavity of claim 12 in the enlarged stud head extending from the surface along the center line of the shank no further than the diameter of the threads on the stud pin, terminating in a spherical end and having diameter of no more than 37.5 % of the diameter of the threads on the stud pin, so that the maximum cross-sectional area of the plug cavity is determined by the formula $\sqrt{P}$ times the diameter of the threads, where P is the area of the threaded end of the stud pin.

14. The plug cavity of claim 12 in the nut end of the dual threaded lug extending from the surface along the center line of the dual over-lug no further than the diameter of the threads on the dual over-lug, terminating in a spherical end and having diameter of no more than 37.5 % of the diameter of the threads on the dual over-lug, so that the maximum cross-sectional area of the plug cavity is determined by the formula $\sqrt{P}$ times the diameter of the threads, where P is the area of the nut end.

15. The dual wheel stud assembly of claim 12, wherein the stud insert comprises zinc.

16. The dual wheel stud assembly of claim 12, wherein the stud insert comprises zinc suitable to act as a sacrificial anode to protect the components of the wheel assembly from corrosion.

17. The dual wheel stud assembly of claim 12, wherein the stud insert is of a color that contrasts with the color of the material of the enlarged stud head, the nut end of the dual threaded lug and the dual over-lug of the dual wheel stud assembly so as to be more readily visible for inspection.

18. The stud insert of claim 12 wherein the end of the stud insert, opposite to the spherical end of the plug cavity, protrudes from the plug cavity in a convex face so as to allow staking should the stud insert become loose in operation.

19. A method of protecting from galvanic corrosion metal components of a wheel assembly, comprised of a wheel, a tire, an axle and a hub with stud passages with lateral splines there through, a stud with an enlarged head at one end, an elongated, substantially cylindrical shank with a larger diameter section, extending from the enlarged head, with lateral splines regularly spaced around its circumference and so arranged as to engage similar splines in stud passages in the hub, threads along the remainder of the shank, stud pin, opposite to the enlarged stud head to its end, and a lug in removable communication with the threads on the shank, stud pin, and capable of being torqued against the components to be secured, comprised of the steps:
creating means for a plug cavity in the threaded end of the shank and penetrating therein, along its centerline, a distance no more than the diameter of the threads on the threaded portion and having a diameter of no more than thirty-seven percent of the diameter of the threads on the threaded portion, and terminating in a spherical end;
swaging an amount of sacrificial metal, higher in electromotive series than the metal of the wheel assembly into the plug cavity and leaving a convex face of the amount of sacrificial metal protruding from the plug cavity;
inspecting the condition of the amount of sacrificial metal for diminishment periodically;
staking the convex face of the amount of sacrificial metal into the plug cavity should the amount of sacrificial metal become loose due to the anodizing action, and
replacing the amount of sacrificial metal when it has deteriorated to the extent it provides no further satisfactory protection for the metal components of the wheel assembly.

20. The method of protecting metal components of a wheel assembly of claim 19 comprised of drilling a plug cavity into the enlarged head of the stud and along the centerline of the shank a distance no more than the diameter of the threads on the threaded portion and having a diameter of no more than thirty-seven percent of the diameter of the threads on the threaded portions, and terminating in a spherical end.

21. The method of claim 19 wherein there is an additional step of coloring the amount of sacrificial metal a color distinctively different than that of the other metal components of the wheel assembly to facilitate the periodic inspections.

22. The method of claim 19, wherein the means for creating the plug cavity is drilling.

23. The method of claim 19, wherein the means for creating the plug cavity is casting.

24. A method of protecting from galvanic corrosion metal components of a dual wheel assembly, comprised of inner and outer wheels, two tires, an axle and a hub with stud passages with lateral splines there through, a stud having an enlarged head at one end, an elongated, substantially cylindrical shank awith a larger diameter section, extending from the enlarged head, with lateral splines regularly spaced around its circumference and so arranged as to engage similar splines in the stud passage in the hub, threads along the end of the shank, stud pin, opposite to the enlarged stud head, a dual threaded lug having inside threads to engage the threads on the stud pin against the inner wheel, and outside threads and extending a sufficient distance beyond the end of the stud pin to accommodate the second wheel, having a nut end to facilitate torquing the dual threaded lug to secure the inner wheel, and a dual over lug which engages the outside threads of the dual threaded lug and is torqued thereon to secure the outer wheel, being comprised of the steps:
creating means for a plug cavity in the threaded end of the shank and penetrating therein, along its centerline, a distance of no more than the diameter of the threads on the threaded portion and having a diameter of no more than thirty-seven percent of the diameter of the threads on the threaded portion, and terminating in a spherical end;
creating means for a plug cavity in the enlarged head of the stud and along the centerline of the shank, a distance of no more than the diameter of the threads on the threaded portion and having a diameter of no more than thirty-seven percent of the diameter of the threads on the threaded portion, and terminating in a spherical end;
swaging an amount of sacrificial metal, higher in the electromotive series than the metal of the dual wheel assembly, into the plug cavities and leaving a convex face of the amount of sacrificial metal protruding from the plug cavities;
inspecting the condition of the amount of sacrificial metal for diminishment periodically;
staking the convex face of the amount of sacrificial metal into the plug cavities should the amount of sacrificial metal become loose due to anodic action; and
replacing the amount of sacrificial metal when it has deteriorated to the extent it provides no further satisfactory protection for the metal components of the dual wheel assembly.

25. The method of claim 24, wherein the means for creating the plug cavity is drilling.

26. The method of claim 24, wherein the means for creating the plug cavity is casting.

27. The method of protecting from galvanic corrosion metal components of a dual wheel assembly of claim 24, wherein an additional step is comprised of creating means for a plug cavity in the end of the nut end of the dual threaded lug penetrating therein, along its centerline, a distance no more than the diameter of the threads on the threaded portion of the shank, stud pin, and having a diameter of no more than thirty-seven percent of the diameter of the threads on the threaded portion of the shank, stud pin, and terminating in a spherical end.

28. The method of claim 27, wherein the means for creating the plug cavity is drilling.

29. The method of claim 27, wherein the means for creating the plug cavity is casting.

\* \* \* \* \*